H. A. GSELL.
SPLINT POSITIONING DEVICE FOR MATCH MACHINES.
APPLICATION FILED MAR. 10, 1911.
1,024,772.
Patented Apr. 30, 1912.
2 SHEETS—SHEET 1.
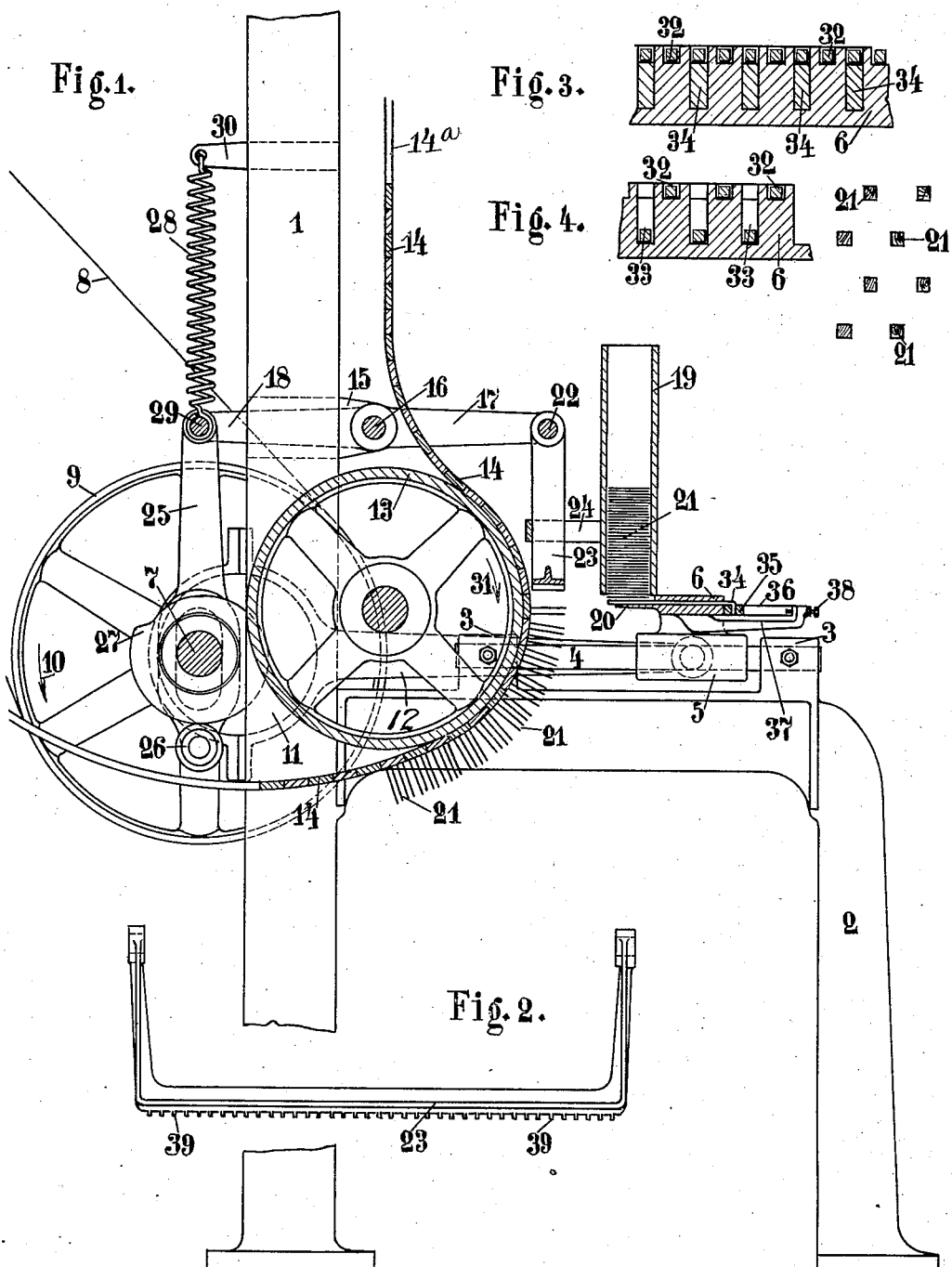

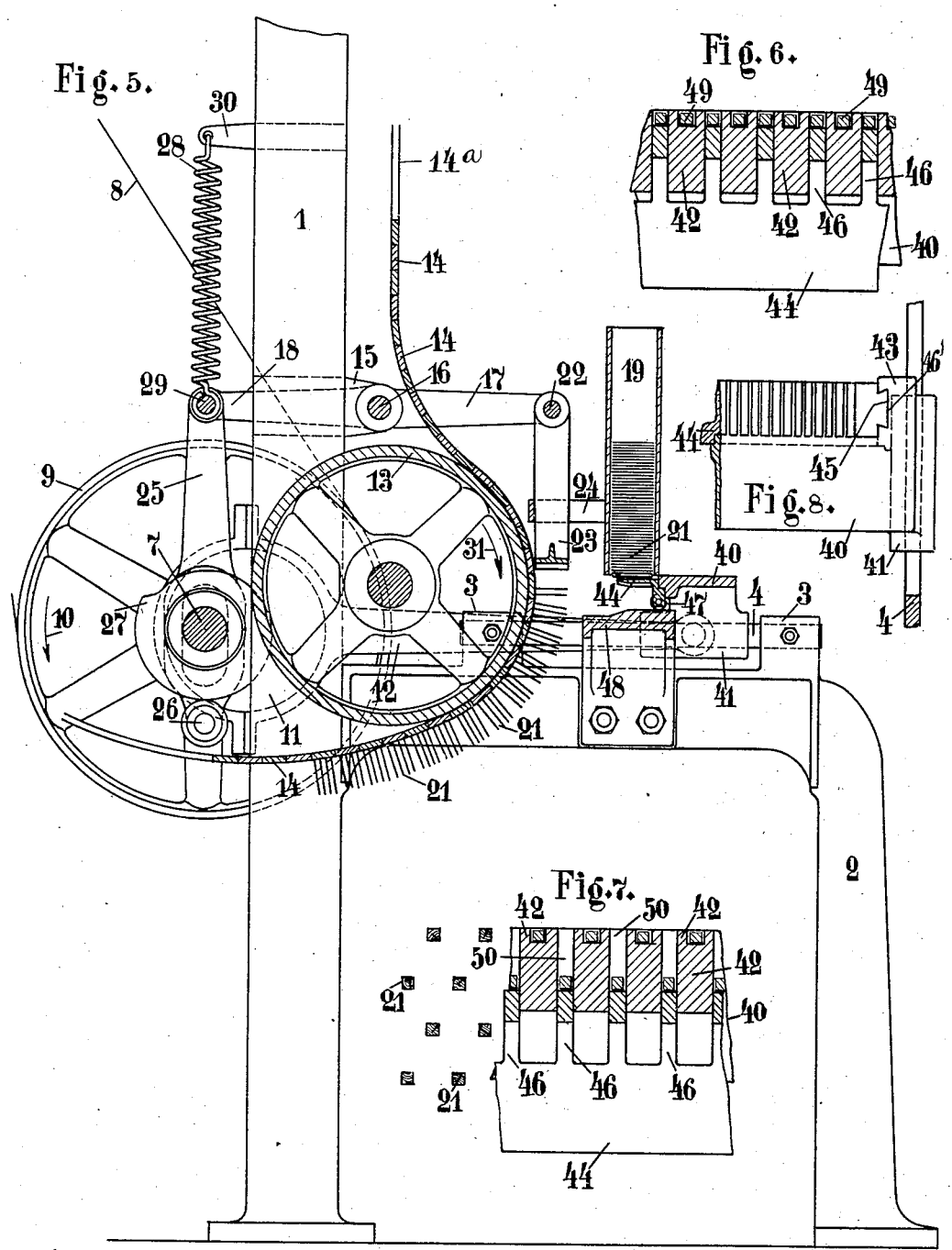

UNITED STATES PATENT OFFICE.

HENRY ALFRED GSELL, OF PARIS, FRANCE.

SPLINT-POSITIONING DEVICE FOR MATCH-MACHINES.

1,024,772.   Specification of Letters Patent.   Patented Apr. 30, 1912.

Application filed March 10, 1911. Serial No. 613,631.

*To all whom it may concern:*

Be it known that I, HENRY ALFRED GSELL, a citizen of the Confederation of Switzerland, residing at Paris, in the Republic of France, have invented a new and useful Splint-Positioning Device for Match-Machines, of which the following is a specification.

Ordinary splint positioning devices for match-machines are in general so arranged, that they can introduce the splints discharged from the magazine into two or more superposed rows of holes in the known carriers of the dipping device and push their ends into the said holes. As is well known, the holes in the several superposed rows in the carrier alternate with one another. In consequence of this the slide movable beneath the magazine in the ordinary devices is provided with a series of parallel grooves of an alternating depth in correspondence with the lower hole walls of two or more superposed rows of holes in the carrier, so that the shallow grooves are just able to each receive a splint from the magazine, while in the deep grooves several superposed splints at a time could find space. This, however, is a serious disadvantage in the old devices, as it is very difficult to so arrange the device as to permit only one splint to be ejected into the lower row of holes, the superposed splint being retained in the deep grooves; these deep grooves being blocked by splints which are either too thick or crooked, or broken, and to clear such grooves may practically necessitate the stopping of operation unless very complicated devices are employed for the purpose of keeping the grooves clear.

My invention relates to improvements in such splint positioning devices, whereby only single splints are permitted to drop into the grooves and the several splints can be safely pushed with their ends into the holes of two or more superposed rows in the carrier.

The improved device presents the advantage, that for the one extreme position of the slide beneath the magazine the parallel grooves in the slide have all the same depth and can each receive only a single splint, while for the other extreme position of the slide in proximity to the carrier the parallel grooves in the slide are alternately shallow and deep, if two rows of holes in the carrier are to be simultaneously supplied with splints, or the grooves may be in groups in each of which the depth of the grooves increases in depth from one to the other, in case more than two rows of holes in the carrier are to receive splints. This effect is obtained with simple means. Either the slide may be provided with grooves, the depth of which is constant for some of them and is made to vary for the other grooves during the motion of the slide from one extreme position to the other extreme position, or the slide may be provided with movable ejectors adapted to fill up spaces in one extreme position and to withdraw from the spaces for the other extreme position.

A further improvement consists of a pusher adapted to automatically feed the carriers one after the other downward in such a manner, that the slide charged with splints can push the ends of the splints into fresh rows of holes in the carriers at the proper moment. An operating shaft in the match-machine is utilized for horizontally reciprocating the slide by means of eccentrics and rods and for vertically reciprocating the pusher by means of cam disks, spring-pressed rods and two-armed levers.

I will now proceed to describe my invention with reference to the accompanying drawings, in which—

Figure 1 is a vertical longitudinal section through the splint positioning device, Fig. 2 is an elevation of the pusher, Fig. 3 is a vertical cross section on an enlarged scale through a part of the slide, when it occupies its one extreme position beneath the magazine, Fig. 4 is a similar section, the slide occupying its other extreme position beneath the pusher, and a few splints positioned in the carrier being shown in cross section, Fig. 5 is similar to Fig. 1 and shows a modification of the slide, Fig. 6 is a vertical cross section on an enlarged scale through a part of the modified slide, when it occupies its one extreme position beneath the magazine, Fig. 7 is a similar section, the slide occupying its other extreme position beneath the pusher, and a few splints positioned in the carrier being shown in cross section, and Fig. 8 is a plan view on a reduced scale of a part of the slide.

Similar characters of reference refer to similar parts throughout the several views.

The frame of the splint positioning device shown at Fig. 1 consists of two parallel columns 1 (of which one only is visible) forming part of the frame of the match-machine and of two parallel bent supports 2 connected with the columns. Each support 2 is made in one with two eyes 3, 3, in which a horizontal bar 4 is fastened. The two bars 4 serve as guides for two sleeves 5 made in one with a horizontal slide or carriage 6. An operating shaft 7 forming part of the match-machine and driven by a belt 8 and a pulley 9 in the direction of the arrow 10 has fastened on it two like eccentrics 11 (one of them only being visible), which are pivotally connected with the two sleeves 5 of the slide 6 by means of two eccentric rods 12. In this manner the slide 6 is reciprocated once for every revolution of the operating shaft 7. On the two columns 1 two bearings (not shown) are secured, in which the journals of a drum 13 are mounted to turn. The width of the drum 13 is approximately equal to the length of carriers 14, 14 and is quite free to turn. The ends of carriers 14, 14 are guided in curved guides 14$^a$ fastened on the two columns 1, so that the carriers are obliged to move in the curve shown. A splint magazine 19 is fastened on the two supports 2 in any known manner (not shown) and the slide 6 is arranged to move close beneath the magazine 19. When the slide 6 occupies its one extreme position on the right, as shown, its left edge 20 is on the right side of the inside of the left wall of the magazine 19 at a short distance therefrom, but when the slide 6 occupies its other extreme position on the left, its left edge 20 will still remain at a slight distance from the respective carrier 14, so that the slide 6 is in a manner to be described later on enabled to push the free ends of the splints 21 into the holes of the carrier 14.

In suitable bearings 15 on the columns 1 a shaft 16 is mounted to rock, which has fastened on it two horizontal two-armed levers 17, 18. The arms 17 carry at their free ends two pins 22, from which a bent pusher 23 of the shape shown at Fig. 2 is suspended. Preferably the pusher 23 is guided in suitable arms 24 on the magazine 19, so as to prevent it from damaging the carriers 14. The other arms 18 of the levers 17, 18, are pivotally connected with two slotted links 25, which are guided by the operating shaft 7 passing through their slots and carry at their lower ends two rollers 26, that are adapted to roll on the periphery of two cam disks 27 fastened on the operating shaft 7. Two helical springs 28 connecting the pins 29 of the arms 18 with suitable studs 30 on the columns 1 serve for pressing the two rollers 26 upward against the two cam disks 27.

Each carrier 14 is assumed to have four parallel rows of holes, the holes in any row alternating with the holes of the neighboring rows, as usual and as is indicated in Fig. 4, where several splints 21, 21 pushed into the holes of the carrier are shown in cross section. As the slide 6 is adapted, in a manner to be presently described, to push the splints only into the holes of two superposed rows in the carrier 14, the cam disks 27 are so shaped as to move the pusher 23 a length equal to the vertical distance between any horizontal row of holes and the next but one following row. In the present case this distance is equal to half the width of any carrier 14. In consequence of this the operating shaft 7 must necessarily make two revolutions to enable the pusher 23 to intermittently feed one carrier after the other in the direction of the arrow 31. The drum 13 is taken along with the carrier 14 simply by the friction between them.

The slide 6 is provided with a series of parallel grooves 32, 33 (Fig. 4) of alternating depth, which grooves for the extreme position of the slide shown at Fig. 1 extend from the left edge 20 to a point on the right side of the inside of the right wall of the magazine 19 at a slight distance therefrom. Thereby the splints 21 are enabled to freely drop into the grooves 32, 33 from the magazine 19. The deep grooves 33, 33 communicate with horizontal cross channels, in which ejectors 34, 34 (Figs. 1 and 3) are guided. The right hand ends of the ejectors 34 in Fig. 1 are downwardly bent and engage in holes of a cross bar 35, which at the ends is guided in suitable guides 36 fastened on the supports 2. The slide 6 is provided with several parallel arms 37, in the bent free ends of which adjusting screws 38 are disposed. The cross bar 35 is adapted to be struck by the right edge of the slide 6 and to be thereby pushed to the right, while the adjusting screws 38 are adapted to strike the cross bar 35 and to push it to the left. When the cross bar 35 is in contact with the right edge of the slide 6, the left ends of the ejectors 34 in Fig. 1 are made to flush with the left edge 20 of the slide. When, however, the cross bar 35 is in contact with the adjusting screws 38, the left ends of the ejectors 34 are made to flush with the right end walls of the deep grooves 33. The ejectors 34, 34 are made so high, that their upper surfaces are in the same plane as the bottoms of the shallow grooves 32, 32, as is clearly shown at Fig. 3.

From an examination of Figs. 1 and 3 it will be evident, that for the extreme position of the slide 6 shown at Fig. 1 the deep grooves 33, 33 are filled by the ejectors 34, 34 up to the plane of the bottoms of the shallow grooves 32, 32, so that only a single splint 21 can drop from the magazine 19 into each shallow groove 32 and into the upper part of each deep groove 33. When the slide 6 is moved by the two eccentrics 11 and two rods 12 to the left in Fig. 1, the right end walls of the shallow grooves 32, 32 and the upper right end walls of the deep grooves 33, 33 will strike the right ends of the splints 21 lying in these grooves and push these splints from under the column of splints in the magazine 19. As at this moment the pressure on the single splints 21 from above ceases, the ejectors 34 are no longer held by the friction produced by the said pressure, so that the cross bar 35 will stop and withdraw all the ejectors 34, and consequently the single splints 21, 21 in the deep grooves 33, 33 will drop on the bottoms and will now register with the holes of the lower row in the carrier 14. The slide 6 is therefore now enabled to push the left ends of the splints into the holes of both the upper and the lower row, since the splints in the shallow grooves 32 are pushed forward by the right end walls of these grooves and the splints in the deep grooves 33, 33 are pushed forward by the ejectors 34, 34, as the adjusting screws 38 have meanwhile struck the cross bar 35 and thereby act upon the ejectors. During the return of the slide 6 the pusher 23 is moved downward, so that it strikes the positioned splints and thereby moves the series of carriers 14, 14 through a distance sufficient for permitting the slide 6 to push fresh splints into the holes of the two next following rows.

The pusher 23 is shown to be provided with teeth 39, 39, which are adapted to press on the splints of the lower row, while the bottoms of the tooth spaces are adapted to press on the splints of the upper row. Where so preferred, the teeth 39, 39 may be omitted.

Of course the slide 6 may be so modified as to push the ends of splints into the holes of more than two superposed rows. The essential point is, that all the ejectors of a varying height be adapted to fill all the deeper grooves up to the plane of the bottom of the shallow grooves and to permit the single splints to drop on the bottoms of the deeper grooves, the depth of which varies.

The carriers 14, 14 charged with splints 21, 21 move to the dipping device as usual.

The splint positioning device described so far may be modified as follows: The slide 6 is replaced by another slide 40 (Figs. 5 to 8) movable with its two sleeves 41 on the two bars 4 and provided with a series of horizontal teeth 42, 42 (see Fig. 7). The slide 40 therefore looks like a comb and has at the ends two arms 43 (Fig. 8) which are each provided with a vertical groove 46' of a dovetailed cross section. A subsidiary slide 44 is vertically guided on the slide 40 by means of its two dovetailed projections 45 engaging in the grooves 46'. The subsidiary slide is also made to look like a comb, it being provided with bent teeth 46, which engage in the narrow spaces 50 between the teeth 42 of the slide 40 and are therein guided. The subsidiary slide 44 is at the lower end provided with two wheels 47, which are adapted to roll on a cross bar 48 secured between the two supports 2. The teeth 42, 42 of the slide 40 are provided in their upper surfaces with shallow grooves 49, 49 corresponding to 32, 32 in Figs. 3 and 4. The spaces 50, 50 between the teeth 42, 42 have the same width as the shallow grooves 49, 49, which width is slightly larger than the width of any splint 21. The upper surface of the cross bar 48 is stepped as shown in Fig. 5, so that the upper surfaces of the teeth 46, 46 of the subsidiary slide 44 remain in the plane of the bottoms of the shallow grooves 49 (see Fig. 6) during the first portion of the stroke of the slides 40, 44 from right to left in Fig. 5, until the single splints 21, 21 in the shallow grooves 49, 49 and in the upper parts of the spaces 50, 50 have been ejected from the magazine 19 through a distance about like three fourths of their length, whereupon the subsidiary slide 44 will gradually lower into the position shown at Fig. 7, so that the upper surfaces of its teeth 46, 46 will be in the plane of the lower sides of the holes in the carrier 14, in other words in the plane of the lower sides of the splints 21 of the lower row to be pushed into the carrier. This lower position of the subsidiary slide 44 in relation to the slide 40 will be henceforward maintained during the last portion of the stroke, so that the ends of the lower splints 21 lying on the upper surfaces of the teeth 46, 46 can be safely driven into the holes of the carrier 14, the same as the ends of the upper splints 21 are driven into the corresponding holes. It will be seen, that also by the modified slide the advantage is obtained, that only a single splint can drop from the magazine into each of the shallow and deep grooves and can be properly positioned.

The splint positioning device can be varied in many respects without departing from the spirit of my invention.

I claim:

1. In a splint positioning device, the combination with a frame, of a splint magazine in said frame, a series of carriers guided in said frame and having each superposed rows of holes for the splints and the holes in any horizontal row alternating with the holes in the neighboring rows, means for intermittently feeding downward said carriers, a slide guided in said frame beneath said magazine and having in its upper surface a series of parallel grooves of various depth corresponding with their bottoms to the lower sides of the holes in several superposed rows in said carriers, means for reciprocating said slide, and means for reducing the depth of the deeper grooves to that of the shallow grooves for one extreme position of said slide beneath said magazine and for reëstablishing their full depth for the other extreme position in proximity of said carriers.

2. In a splint positioning device, the combination with a frame, of a splint magazine in said frame, a series of carriers guided in said frame and having each superposed rows of holes for the splints and the holes in any horizontal row alternating with the holes in the neighboring rows, means for intermittently feeding downward said carriers, a slide guided in said frame beneath said magazine and having in its upper surface a series of parallel grooves of various depth corresponding with their bottoms to the lower sides of the holes in several superposed rows in said carriers, parallel ejectors horizontally guided in said slide and adapted to fill up the deeper grooves to a depth like that of the shallow grooves each arranged for receiving a single splint and to withdraw from the grooves whereby the single splints are permitted to drop on the bottoms of the deeper grooves, means for reciprocating said slide, and means for moving said ejectors during the motion of said slide.

3. In a splint positioning device, the combination with a frame, of a drum loose in said frame, a series of carriers so guided in said frame as to come in contact with said drum and to take it along with them before leaving it, said carriers having each superposed rows of holes for the splints, an operating shaft parallel to said drum and mounted to turn in said frame, a splint magazine in said frame, a slide guided in said frame beneath said magazine and adapted to receive therefrom splints and to drive them into several superposed rows of holes in said carriers, means operated from said operating shaft for reciprocating said slide, a pusher vertically guided in said frame and adapted to strike and push downward the splints just driven into any of said carriers whereby the latter are intermittently fed, and means operated by said operating shaft for reciprocating said pusher.

4. In a splint positioning device, the combination with a frame, of a drum loose in said frame, a series of carriers so guided in said frame as to come in contact with said drum and to take it along with them before leaving it, said carriers having each superposed rows of holes for the splints, an operating shaft parallel to said drum and mounted to turn in said frame, a splint magazine in said frame, a slide guided in said frame beneath said magazine and adapted to receive therefrom splints and to drive them into several superposed rows of holes in said carriers, eccentrics on said operating shaft, eccentric rods connecting said eccentrics with said slide, cam disks on said operating shaft, a shaft parallel to said drum mounted in said frame to rock, two-armed levers on said shaft, rods pivotally connected at one end with arms of said two-armed levers and guided on said operating shaft, rollers at the other ends of said rods adapted to roll on said cam disks, springs for pressing said rollers on said cam disks, and a pusher guided in said frame and pivotally connected with the other arms of said two-armed levers, whereby said pusher is adapted to strike and push downward the splints just driven into any of said carriers so that the latter are thereby intermittently fed.

HENRY ALFRED GSELL.

Witnesses:
A. SCHILT,
WILHELM REHMER.